(12) United States Patent
Schulz

(10) Patent No.: US 11,909,286 B2
(45) Date of Patent: Feb. 20, 2024

(54) COIL ARRANGEMENT FOR AN ELECTRICAL MACHINE

(71) Applicant: Florian Schulz, Munich (DE)

(72) Inventor: Florian Schulz, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 547 days.

(21) Appl. No.: 16/941,719

(22) Filed: Jul. 29, 2020

(65) Prior Publication Data

US 2021/0036568 A1  Feb. 4, 2021

(51) Int. Cl.
  *H02K 3/34* (2006.01)
  *H02K 15/10* (2006.01)
  *H02K 3/12* (2006.01)
  *H02K 3/30* (2006.01)

(52) U.S. Cl.
  CPC .............. *H02K 3/345* (2013.01); *H02K 3/12* (2013.01); *H02K 15/105* (2013.01); *H02K 3/30* (2013.01)

(58) Field of Classification Search
  CPC .. H02K 3/12; H02K 3/30; H02K 3/34; H02K 3/345; H02K 15/10; H02K 15/105
  USPC ............................ 310/208, 216.104, 216.105
  See application file for complete search history.

(56) References Cited

U.S. PATENT DOCUMENTS

| | | | | |
|---|---|---|---|---|
| 5,175,396 A | * | 12/1992 | Emery | ...................... H02K 3/40 174/DIG. 27 |
| 11,374,454 B2 | * | 6/2022 | Kasai | ........................ H02K 3/34 |
| 2008/0231136 A1 | * | 9/2008 | Obata | ...................... H02K 3/38 310/179 |
| 2010/0244615 A1 | * | 9/2010 | Kouda | ...................... H02K 3/48 310/215 |
| 2020/0126688 A1 | * | 4/2020 | Ikeda | .................... H01B 7/2813 |
| 2020/0177057 A1 | * | 6/2020 | Uryu | ........................ H02K 3/30 |
| 2020/0227968 A1 | * | 7/2020 | Yoshitake | ................ H02K 3/40 |

* cited by examiner

*Primary Examiner* — Rashad H Johnson
(74) *Attorney, Agent, or Firm* — Lempia Summerfield Katz LLC

(57) ABSTRACT

The disclosure relates to an electric machine of an electrical system, (e.g., a drive system), and in particular to the electrical insulation of a coil of the machine. A coil arrangement includes a coil, formed by an electrical coil conductor, and also an insulating arrangement. The coil is arranged at an electrically conductive element of the machine, for example, at or on a corresponding tooth of a stator or of a rotor of the machine, which is formed by a laminated core. The insulating arrangement is configured to insulate the coil from the electrically conductive element, (e.g., from the laminated core forming the tooth). The insulating arrangement has a first, electrically conductive layer, which is at least partly arranged between the coil and the metallic component. Furthermore, the first layer is electrically connected to the metallic component, in order to prevent partial discharges between the insulating arrangement and the metallic component.

16 Claims, 7 Drawing Sheets

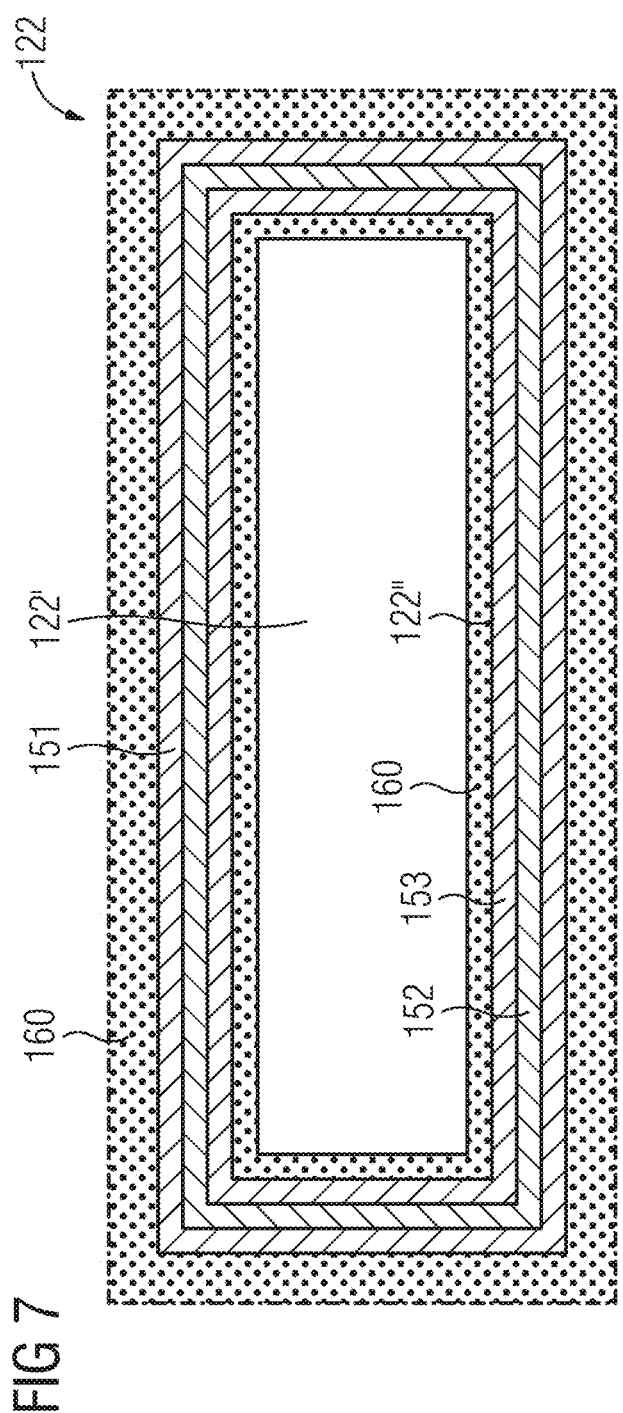

COIL ARRANGEMENT FOR AN ELECTRICAL MACHINE

The present patent document claims the benefit of German Patent Application No. 10 2019 211 267.6, filed Jul. 30, 2019, which is hereby incorporated by reference.

TECHNICAL FIELD

The disclosure relates to an electric machine of an electrical system, (for example, of an electrical drive system), and in particular to the electrical insulation of the winding system of the machine.

BACKGROUND

With the ever-increasing performance capability of electric machines, expressed for example by the so-called power density, there is also an increase in the stressing of the electrical insulation, and consequently possibly, among other things, the risk of system failures. In particular, for the case where the machine is to be used in a safety-critical environment, (e.g., as a component of a drive system of an electrically powered aircraft), an extremely high degree of failure safety is targeted. The electrical insulation system of the machine in particular plays a significant part here in achieving a high degree of failure safety.

In particular, as a result of operating with power electronics, the insulation system of rotating, electric machines is subjected to increased loading due to various influencing factors, (e.g., due to overshooting of the voltage provided as a result of a switching operation, due to voltage reflections at the input terminals of the machine, due to non-linear voltage drops along the winding system, and/or due to increased frequencies of partial discharges). As a result of this, even in insulation systems that are designed for the low-voltage region, during continuous operation such high electrical field strengths may briefly occur that partial discharges may be created. Such partial discharges may have such effects in the insulation system that they lead locally to an electrical short circuit, and finally to failure of the machine.

In particular, the organic insulating materials that may be used in this application area have a very low resistance to partial discharges. Without countermeasures against the effects described, the actually achievable lifetime of such a machine may be reduced by several orders of magnitude. There is every prospect that, in view of the current development of future generations of semiconductors, which are integrated in the power electronics ahead of the machine, this problem will continue to increase.

The problem described is critical not least against the background that commonly applied standards for the low-voltage region require the insulation system to be designed free from partial discharges during the continuous operation of the machine. For this purpose, it is necessary to avoid that the local electrical field strength exceeds the dielectric strength in the medium present. Although the dielectric strength for insulating materials that are used is very high, air inclusions within the insulation system represent critical weak points, where there are increases in the electrical field due to the generally lower dielectric conductivity. As a result, even air inclusions in the range of micrometers may compromise the lifetime of such an electric machine.

However, for process-related reasons, the presence of such air inclusions cannot be completely ruled out with the commonly used impregnating processes. An added difficulty is that, irrespective of its cause, a deterioration in the condition of the insulation may only in some cases be detected by measuring instruments. For instance, a degradation of the conductor-ground insulation may be monitored by measuring the insulation resistance. For the conductor-conductor insulation, on the other hand, there is no established method by which the lifetime until a short-circuit occurs may be predicted or by which, in the event of a fault, it would even be possible to detect destruction of the machine in time.

This problem of the lifetime-reducing effects on the insulation due to partial discharges is addressed in various ways. For example, air inclusions may be avoided to the greatest extent by the turns being potted or impregnated, for example, by using corresponding resins. Even in this case, however, critical air inclusions may continue to remain, in particular in the region between a slot and a slot insulation. Furthermore, a reduction of local field strengths may be achieved by corresponding dimensioning, so that partial discharges cannot permanently occur even in remaining air inclusions. However, this adaptation of the dimensioning has adverse effects on the performance of the machine. In particular, in the case of the machines operating in the high-voltage region, it is not unusual to wrap the conductors in a kind of conductive adhesive tape. Even this does not sufficiently solve the problem of air inclusions that remain, for example, when the preformed conductor bars are inserted into the slots of large motors or generators, because, for example, such air inclusions, and consequently the risk of partial discharges, may be caused by delamination. Because, in effect, a prediction of interturn faults also may not be possible sufficiently reliably and with reasonable effort, the risk of partial discharges mentioned at the beginning represents a considerable safety risk.

SUMMARY AND DESCRIPTION

It is therefore an object of the present disclosure to provide a way of creating an electrical system with increased operational reliability.

This object is achieved by the coil arrangement and the methods described herein.

The scope of the present disclosure is defined solely by the appended claims and is not affected to any degree by the statements within this summary. The present embodiments may obviate one or more of the drawbacks or limitations in the related art.

The coil arrangement includes a coil, which is formed by an electrical coil conductor and is to be arranged at, (e.g., in the vicinity of), an electrically conductive component, in particular of an electric machine.

The electrically conductive component may be a laminated core of a stator or of a rotor of the electric machine and, in particular for the case where the coil is not an air coil, also a tooth of such a stator or rotor, at or in that case "on" which the coil may be arranged.

Furthermore, the coil arrangement includes an insulating arrangement for the electrical insulation of at least one turn of the coil conductor of the coil from an electrically conductive element of the electric machine.

This electrically conductive element may be the electrically conductive component itself, e.g., the laminated core or the tooth. The electrically conductive element may also be a further turn of the same coil conductor of the coil or a turn of a coil conductor of an adjacently arranged coil.

The insulating arrangement has for its part a first, electrically conductive layer, which is to be arranged between the turn to be insulated of the coil and that electrically conductive element from which the turn is to be insulated. In this case, the first layer is electrically connectable to the electrically conductive component, e.g., to the laminated core.

The electrical contacting of the first layer with the metallic component may take place at any desired location, for example, possibly at the tooth itself.

The laminated core, and consequently then also the first layer, may be electrically connected to ground.

With regard to the term the electrically conductive "layer", it should be noted that the only decisive factor here is that the layer may to the greatest extent shield an electrical field. In this respect, minor defects would be acceptable, so that the term "layer" may well also include a narrow-meshed grid, a layer provided with holes and even scratches.

As far as the slot is concerned, the potential is clearly defined by the ground. Here it makes no difference where the contact is established.

In a first embodiment, the electrically conductive element is a laminated core of a stator or of a rotor of the electric machine, and in particular a tooth of the stator or of the rotor, on which the coil is to be arranged. The insulating arrangement is a slot insulation formed in a film-like or sheet-like manner, which is placed between the coil and the electrically conductive element, the slot insulation having the first, electrically conductive layer and also a second, electrically insulating layer. In this case, the first layer represents a conductive surface that has been applied to the second layer.

The slot insulation is arranged between the coil and the electrically conductive element, (e.g., the laminated core or the tooth), in such a way that the first, electrically conductive layer is facing the electrically conductive element and the second, electrically insulating layer is facing the coil.

Furthermore, seen in an axial direction of the machine, the second layer is dimensioned in such a way that it protrudes beyond the axial ends of the electrically conductive element. On the other hand, the first layer is dimensioned in such a way that it does not protrude significantly, (e.g., in particular apart from possible tolerance-related projections), beyond the axial ends of the electrically conductive element.

In this first embodiment of the insulating arrangement as a slot insulation provided with a conductive surface, the commonly used slot insulation is replaced by a construction according to the disclosure. This is placed into the slot in such a way that the conductive surface is in contact with the laminated core, (e.g., in the region of the tooth), so that the same electrical potential forms at these objects. For production, after positioning the slot insulation in the slot, the winding of the tooth with the conductor forming the coil and the final impregnation or potting are performed. While the slot insulation may be led out further from the axial region of the tooth or of the laminated core, in order to provide the necessary air gaps and creep paths in the winding overhang region, the conductive surface may not protrude beyond the slot or the tooth but be restricted to the length thereof.

So even if air inclusions happen to remain in the interspace of the tooth and the slot insulation, partial discharges may no longer occur as a result of the absence of a potential difference. This application is expedient and sufficient in particular whenever the freedom from partial discharges on the side of the slot insulation facing the coil may be provided in some other way. This may be achieved, for instance, by reliable filling of the cavities because of better accessibility.

In an alternative embodiment of the insulating arrangement, the latter, and consequently in particular also at least the first, electrically conductive layer, is formed substantially in a tubular manner and surrounds the electrical coil conductor forming the coil in the circumferential direction thereof or in the tangential direction with respect to the longitudinal extent of the coil conductor. In this case, the coil conductor extends in its longitudinal direction within the insulating arrangement, and consequently in particular also at least within the first, electrically conductive layer, which, as already mentioned, is electrically connected to the laminated core.

In the installed state, the coil conductor has been wound onto the tooth, and thus forms the coil. Alternatively, the coil may also be formed as an air coil, which then (following the wording given above) is arranged "at" the electrically conductive component, (e.g., at or in the vicinity of the laminated core).

In this way, difficult-to-detect short-circuits between turns may be prevented. Instead, the first time the insulation fails, there is a short-circuit to ground with the electrically conductive surface lying in between. At least if it is detected in good time, a short-circuit to ground does not necessarily lead to short-term failure of the machine, so that an escalation of the fault may be prevented by suitable measures, and the risk of further destruction, for instance resulting in fire, may be greatly reduced.

An imminent insulation fault would lead to an increasing, measurable flow of current between the coil conductor and ground. Consequently, an assessment of the condition of the insulation may be made and a statement concerning the lifetime of the insulation system is made possible. As a result of a low electrical resistance of the first layer or the surrounding filling materials, a high degree of sensitivity may be achieved.

The flow of current occurring in the case of the short-circuit to ground may also be detected during operation. Commonly used safety systems are based on differential relays at the supply leads of the coils, which measure an imbalance in the flow of current or the resulting magnetic field.

The term "tubular" means in effect that the respective "tubular" element on the one hand has a length that may be greater than its diameter. On the other hand, with regard to the cross section of the tubular, and consequently hollow, element, it is the case that it corresponds substantially to the cross section of that object that the respective tubular element surrounds. The surrounded object may be the coil conductor, which may be formed as a flat conductor or as a round conductor, so that the cross section is round or substantially rectangular. Other cross sections are of course conceivable and the cross section of the respective tubular element surrounding this object is chosen appropriately in each case. In this case, the term "tubular" also includes that the tubular element is closed in the tangential direction and open at the ends at a distance from one another in the longitudinal direction, the "tangential" direction being oriented at the longitudinal extent of the respectively surrounded object, (e.g., the wire or the coil conductor). Thus, the tubular element in effect forms a surface that is closed apart from the ends around the respectively surrounded object. It is also advantageously the case here that the insulating layer may protrude beyond the conductive layer, so that air gaps and creep paths are realized.

In this embodiment with a tubular insulating arrangement, in which the coil conductor extends, it is also achieved in particular that no partial discharges occur between different turns of the same coil or else between turns of adjacent coils. In this case, it is also true that the electrically conductive element from which the turn is to be electrically insulated may be a further turn of the same coil conductor of the coil or a turn of a coil conductor of an adjacently arranged coil.

In a first variant of the second embodiment, the coil conductor has an electrically conductive wire and also a substantially tubular wire insulation, which surrounds the wire in the circumferential direction thereof and is not electrically conducting. The wire extends in its longitudinal direction within the wire insulation, the tubular first, electrically conductive layer of the insulating arrangement for its part being arranged between the wire and the wire insulation, surrounding the wire in the circumferential direction thereof, so that the wire extends in its longitudinal direction within the first layer and is electrically connected to the first layer.

In a second variant of the second embodiment, the coil conductor has an electrically conductive wire and also a substantially tubular wire insulation, which surrounds the wire in the circumferential direction thereof, or in the tangential direction with respect to the longitudinal extent of the wire, and is not electrically conducting. The wire extends in its longitudinal direction within the wire insulation and the tubular first, electrically conductive layer of the insulating arrangement surrounds the wire insulation in the circumferential direction thereof, so that the wire insulation is arranged between the wire and the first layer.

Application of the conductive first layer on the wire insulation allows the turns of the coil to be arranged in any way desired, without an electrical field being able to extend between them.

A further electrically conductive layer may be provided. The further electrically conductive layer is likewise formed in a tubular manner and arranged between the wire and the wire insulation, surrounding the wire in the circumferential direction thereof, so that the wire extends in its longitudinal direction within the further layer and is electrically connected to the further layer.

If, for example due to aging or high mechanical stressing at individual points, the insulation may lift off from the conductor, the function of the insulating arrangement with regard to the avoidance of partial discharges would not be lost, (e.g., local defects would still not be critical in terms of safety).

The direct application of a conductive layer on the wire implemented here brings about a reduction in the complexity of the insulation system. Instead of different materials for the insulation of the coil conductors, the coils of adjacent teeth and the slot, only one electrical insulating layer is used. If it is continuous, no delamination and associated occurrence of partial discharges may occur within it. Because it is firmly connected to the conductor, the production expenditure falls correspondingly.

In a third variant of the second embodiment, the insulating arrangement has the first, electrically conductive layer, a second, electrically insulating layer and also a third, electrically conductive layer. The first, the second, and the third layer are in each case tubular and are arranged coaxially in relation to one another, the second layer being arranged within the first layer, the third layer being arranged within the second layer, and the coil conductor being arranged within the third layer, so that it extends in its longitudinal direction within the third layer, and is thereby electrically connected to the third layer.

The insulating arrangement thus coated in an electrically conducting manner on both sides forms a closed surface around every winding of the coil formed by the coil conductor.

The coated inner side now extends parallel to the turn and may (in principle) be contacted with it at any desired point. The beginning and the end of the coil conductor are suitable for this, for example, at soldering or crimping points.

As a result of the electrically conductive coating on both sides of the second layer, not only the region between the insulating arrangement and the laminated core but also that between the insulating arrangement and the coil conductor are kept free from partial discharges. Therefore, a region that is free from fields in the radial direction, and consequently protection from partial discharges, is also achieved within the insulating arrangement.

The second embodiment has particularly advantageous effects in the situation where the electrically conductive element from which the at least one turn of the coil conductor of the coil is to be insulated is a further turn of the same coil conductor or a turn of a coil conductor of a further, (e.g., adjacent), coil of the electric machine.

In the second embodiment, that the insulating arrangement, and with it each of the various conducting and non-conducting layers, respectively, may form a surface that is closed when seen in the circumferential direction of the coil conductor around every turn of the coil formed by the coil conductor.

In the embodiments, the coil arrangement may be potted with a potting or impregnating compound. This compound may include conductive, (e.g., metallic), particles and accordingly have a certain electrical conductivity. Because, as a result of the described insulating arrangement, no electrical fields emanate any longer from the coil conductor between the individual turns of the coil and the coil conductors of adjacent coils, (e.g., different phases), in the region of the impregnation or the potting, these impregnating compounds no longer have to be of an electrically insulating design. A filling with conductive particles may hereby bring about a significant increase in the thermal conductivity of the impregnating compound, in order to improve the removal of heat from the winding.

If the first layer is grounded, neither the fillers, such as the impregnating resin, nor a possibly surrounding cooling medium has to be of an insulating design in order to prevent short circuits in the case of damage to the insulation. From the viewpoint of mechanical stability, heat conduction and protection from environmental influences, these materials do however continue to be significant in terms of insulation coordination. These properties may be improved specifically if the requirement for using insulating materials is relinquished. Consequently, for instance, specifically conductive, metallic fillers may be used to increase the thermal conductivity. Also, a cooling medium with a higher thermal capacity, such as water, may be used without increased risk.

In the electrical field-free region, the impregnating compound or else the cooling medium is not attributed any further improvement of the dielectric conditions, in particular freedom from air inclusions. As a result, much simpler application methods may be used, without compromising the lifetime of the machine.

Advantageously, the first layer, and consequently also the electrically conductive component, are grounded, so that in effect no electrical fields emanate any longer from the surface of the insulation. This obviates the need for maintaining air gaps and creep paths and for avoiding sharp edges, for example, at parts of the casing or the like, which may otherwise lead to increases of the field. There is consequently a decrease in the required design expenditure, and the installation space that correspondingly becomes free may be put to a different use, for instance, for a more compact design.

The various electrically insulating layers may be produced from a thermoplastic. Commonly used insulating materials include wire lacquers, polyimide films (e.g., Kapton), polyaramid fibers (e.g., Nomex) and corresponding laminates. Owing to a not-to-be-provided freedom from holes, poor adhesion, or lack of a flat surface, these are not ideal for a continuous, conductive coating. Furthermore, their mechanical strength is too low to allow them to be applied in the slot without a reinforcing coating. Thermoplastics, (e.g., polyether ether ketone or 'PEEK'), on the other hand, may meet all of these requirements. Moreover, they have a high electrical dielectric strength, temperature resistance, mechanical strength, and chemical resistance. Thermoplastics may be largely freely formed or applied directly to a wire by extrusion within a continuous process. Subsequently, the desired surface regions, as aimed for here, may be provided with a metallic layer. Alternatively, by coextrusion with conductive particles, filled boundary layers may be realized in the same process act.

In a first act of a method for electrically insulating at least one turn of a coil conductor of a coil of an electric machine from an electrically conductive element of the electric machine, (e.g., from a tooth), by using an insulating arrangement formed as a sheet-like or film-like slot insulation, a first, electrically conductive layer of the insulating arrangement and a second, electrically insulating layer of the insulating arrangement are applied one on top of the other. In a second act, the sheet-like slot insulation thus formed is placed in a spatial region between the first tooth and a tooth adjacent to the first tooth of the electric machine in such a way that the first layer enters into electrical contact with the electrically conductive component of the electric machine. In a third act, a coil conductor forming the respective coil is in each case wound onto every tooth that is in electrical contact with the slot insulation, so that the slot insulation lies between the first tooth and the coil conductor wound onto this first tooth.

In a first act of an alternative method for electrically insulating at least one turn of a coil conductor of a coil of an electric machine from an electrically conductive element of the electric machine by using a tubular insulating arrangement, at least one first, electrically conductive layer of the insulating arrangement and a second, electrically insulating layer of the insulating arrangement are applied one on top of the other. In a second act, the coil conductor is placed into the insulating arrangement and the insulating arrangement is shaped into a tubular form in such a way that the insulating arrangement surrounds the electrical coil conductor in the circumferential direction thereof, so that the coil conductor extends in its longitudinal direction within the insulating arrangement, the second layer being arranged within the first layer and the coil conductor being arranged within the second layer. In a third act, the coil conductor constructed in this way, with the insulating arrangement surrounding it, is wound for example onto the tooth to form the coil and the first layer is brought into electrical contact with an electrically conductive component of the electric machine.

Before the second act, a third, electrically conductive layer may be placed on the side of the first layer that is opposite from the second layer, so that the third layer of the tubular insulating arrangement extends within the second layer, the third layer being electrically connected to a wire of the coil conductor.

The concept underlying the disclosure is based on preventing the occurrence of partial discharges by potential shaping. For this purpose, an insulating material for example from the low-voltage region is provided with a conductive surface. It may then be electrically connected in particular to the surrounding laminated core, and thereby achieve the same electrical potential as the laminated core. As a result, the occurrence of a voltage between the laminated core and the surface of the insulation facing is avoided. Consequently, no partial discharges may occur in this region. By coating on both sides or direct application to a conductor, partial discharges may be prevented completely.

The described approach combines the positive properties of for example thermoplastics, (e.g., PEEK), in their function as low-voltage insulating materials, for instance as slot insulation or conductor insulation, with an electrically conductive coating for potential shaping. This combination of an insulating material, which may be produced with negligible air inclusions, with a conductive surface provides a complete, compact insulation system with a defined boundary. Outside this, no relevant electrical field strengths to be insulated occur any longer. If the insulating material is first applied to an electrical conductor, complete filling of the region between the conductor and the boundary layer of the insulation may be provided. As a result, the insulation system at the tooth may already be completely defined in electrical terms. Partial discharges are consequently reliably prevented and the advantages of future developments in power electronics may be used without having to fear a drastic reduction in the lifetime of the machine.

In the specific configuration of the insulating arrangement as a tubular element which encloses the coil conductor, it is also true that, as a result of the defined geometry of the insulating and conductor arrangement, the electrical field distribution in the insulation system is known and greatly inhomogeneous regions may be ruled out by using corresponding dimensioning and system design. For example, the thickness of the insulation may be chosen such that it is correspondingly exactly appropriate. This thickness may be greater than the wire insulation may be used up to now. However, as a result of the non-linear voltage drop during operation with power electronics, there are now already decisive loads on the input turn, which depend not least on the edge steepness of the pulses. In order to withstand these, already much thicker or additional wire insulations than would be necessary in the case of a linear voltage drop are used. Furthermore, insulating materials cannot in any case be made to any desired thinness, so that also according to the disclosure layer thicknesses below 50 micrometers (µm) do not appear to be practicable at present. This would already be enough to achieve dielectric strengths of 6 kilovolts (kV), which may be considered adequate for low-voltage insulation.

The use of the described solution is suitable in particular, but not exclusively, in the case of electric machines that are operated with power electronics and the insulation system of which is designed for the low-voltage region. The advantages of the greatly increased freedom of machine design and the avoidance of interturn short-circuits may be used in the case of all electric machines, but are particularly suitable for machines with increased requirements in terms of failure safety and performance. It applies in principle that the use of the described solution may prevent, or at least slow down, electrical aging of the machine.

Further advantages and embodiments may be found in the drawings and the corresponding description.

BRIEF DESCRIPTION OF THE DRAWINGS

In the text which follows, the exemplary embodiments are explained in more detail with reference to drawings. There, the same components are identified by the same designations in various figures. It is therefore possible that, when a second figure is being described, no detailed explanations will be given of a specific designation that has already been explained in relation to another, first figure. In such a case, it may be assumed for the embodiment of the second figure that, even without detailed explanation in relation to the second figure, the component identified there by this designation has the same properties and functionalities as explained in relation to the first figure. Furthermore, for the sake of clarity, in some cases not all the designations are shown in all of the figures, but only those to which reference is made in the description of the respective figure.

In the drawings:

FIG. 7 shows details of the insulating arrangement in the fourth embodiment.

DETAILED DESCRIPTION

The terms such as "axial", "radial", "tangential", etc. respectively relate to an element that has a longitudinal extent, for example, a wire or a tubular object. In this case, "axial" describes a direction parallel to the longitudinal extent, "radial" describes a direction orthogonal to the longitudinal extent, toward or away from the latter, and "tangential" or else "in the circumferential direction" is a direction which is directed at a constant radial distance from said element and with a constant axial position in a circle around the latter.

The expression "coaxial components", (e.g., coaxial tubular objects), is understood here as meaning components of which the vectors of longitudinal extent coincide or are identical with respect to direction and position. The expression does not necessarily require that coaxial components have the same radius.

Figure 1:
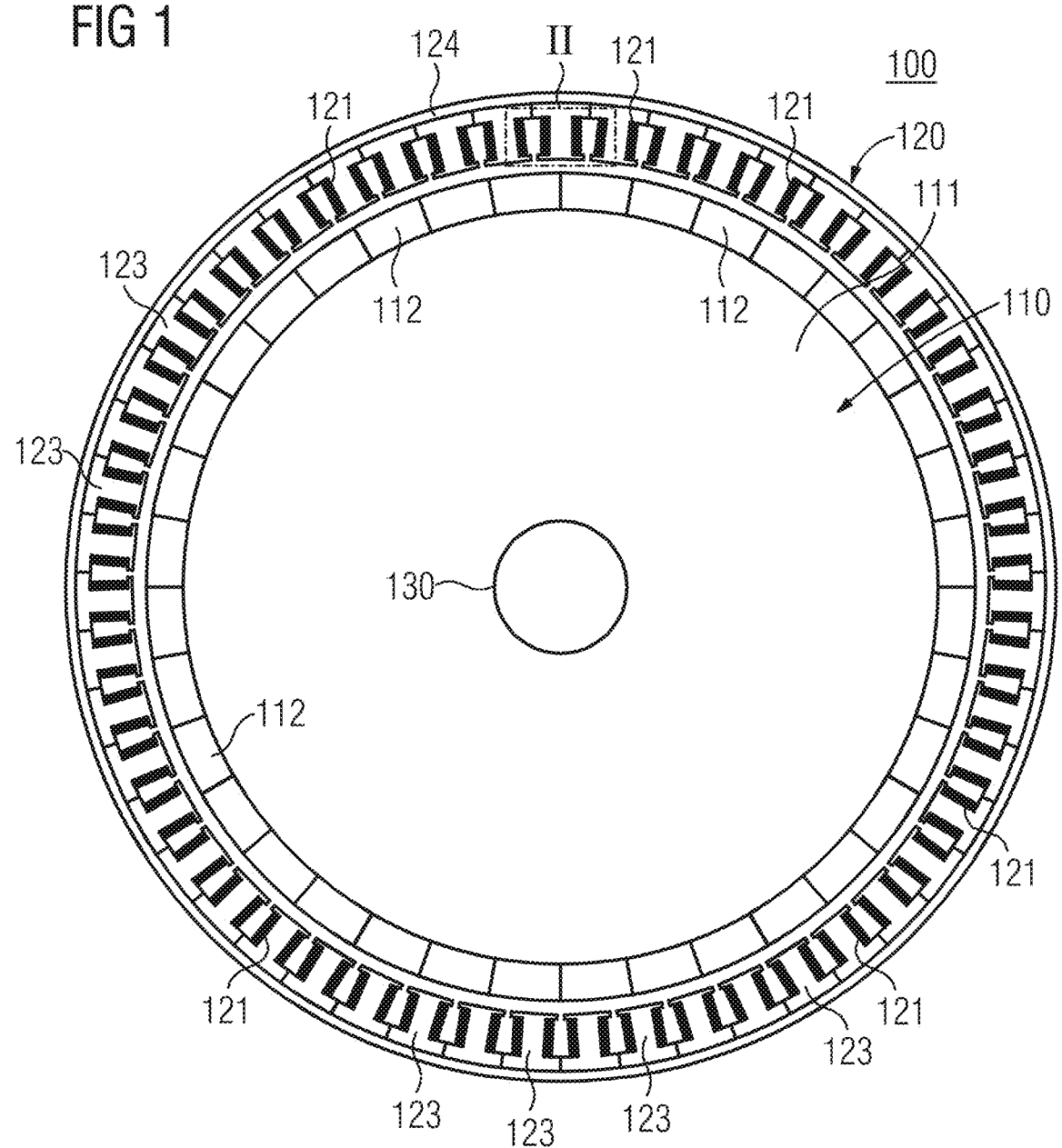
FIG. 1 shows a known electric machine.

FIG. 1 shows by way of example an electric machine 100 formed as an electric motor, as is known in the prior art. The electric machine 100, in a similar construction, may also be operated as a generator. Furthermore, the construction of the machine 100 described in the text which follows is greatly simplified and furthermore does not show some of the details explained in connection with the other figures, but rather serves only to illustrate the fundamental functional mode of the electric motor 100. It may be assumed to be known that the various components of the machine 100 may be arranged differently, depending on whether the electric machine 100 is formed as a generator or as an electric motor and/or as for example a radial-flow or axial-flow machine with a rotor formed as an internal or external rotor, etc.

The electric motor 100 has a substantially annular stator 120 and a substantially cylindrical rotor 110, formed here as an internal rotor, the rotor 110 being arranged within the stator 120 and, in the operating state of the electric motor 100, rotating about an axis of rotation. The rotor 110, or its substantially cylindrical rotor main body 111, is connected to a shaft 130 for conjoint rotation, so that a rotation of the rotor 110 may be transmitted via the shaft 130 to a component to be driven (not shown), (e.g., to a propeller of an aircraft or the like.)

The stator 120 has first magnetic elements or components 121, which may be stator windings 121 or coils 121. Each of the coils 121 is formed by an electrical coil conductor 122 (not identified by a designation in FIG. 1 for the sake of clarity). The coil conductors 122 have in each case been wound onto a stator tooth 123 of the stator 120 and, in the operating state of the electric motor 100, are flowed through by an electric current, so that magnetic fields are generated. The stator teeth 123 are fastened on a stator ring 124. The rotor 110 has second magnetic elements or components 112, which may be permanent magnets or as excited or excitable windings. It is assumed in the text which follows that they are permanent magnets 112.

For the sake of clarity, only a small number of first and second magnetic components 121, 112 and stator teeth 123 are provided with designations.

The first and the second magnetic components 121, 112 are formed and arranged in relation to one another so as to be spaced apart from one another by an air gap in such a manner that, in the operating state of the electric motor 100, they interact electromagnetically with one another. This concept, including the conditions for the formation and precise arrangement of the magnetic components 112, 121 or of the rotor 110 and stator 120, are known per se and are therefore not explained in more detail in the text which follows. To operate the electric machine 100 as an electric motor, by using a current source that is not shown, an electric current is applied to the coils 121 and has the effect that the coils 121 generate corresponding magnetic fields, which come to interact electromagnetically with the magnetic fields of the permanent magnets 112 of the rotor 110. This results in a torque acting on the rotor 110 equipped with the permanent magnets 112, which, provided that the permanent magnets 112 are connected sufficiently firmly to the rotor main body 111, results in the rotor 110, and with it the shaft 130, being set in rotation when said components are suitably formed and arranged in relation to one another.

This concept of forming the electric machine 100 as an electric motor may be assumed to be known. The corresponding configuration and use of the electric machine 100 as a generator may also be assumed to be known. In this configuration, the shaft 130, and with it the rotor 110, are driven by a motor or the like, so that electric currents are induced in the coils 121. These may be picked off at corresponding electrical contacts of the electric machine 100 that are not shown. On account of the familiarity of the concepts, the two forms of the electric machine 100 are not detailed any further in the text which follows.

Figure 2:
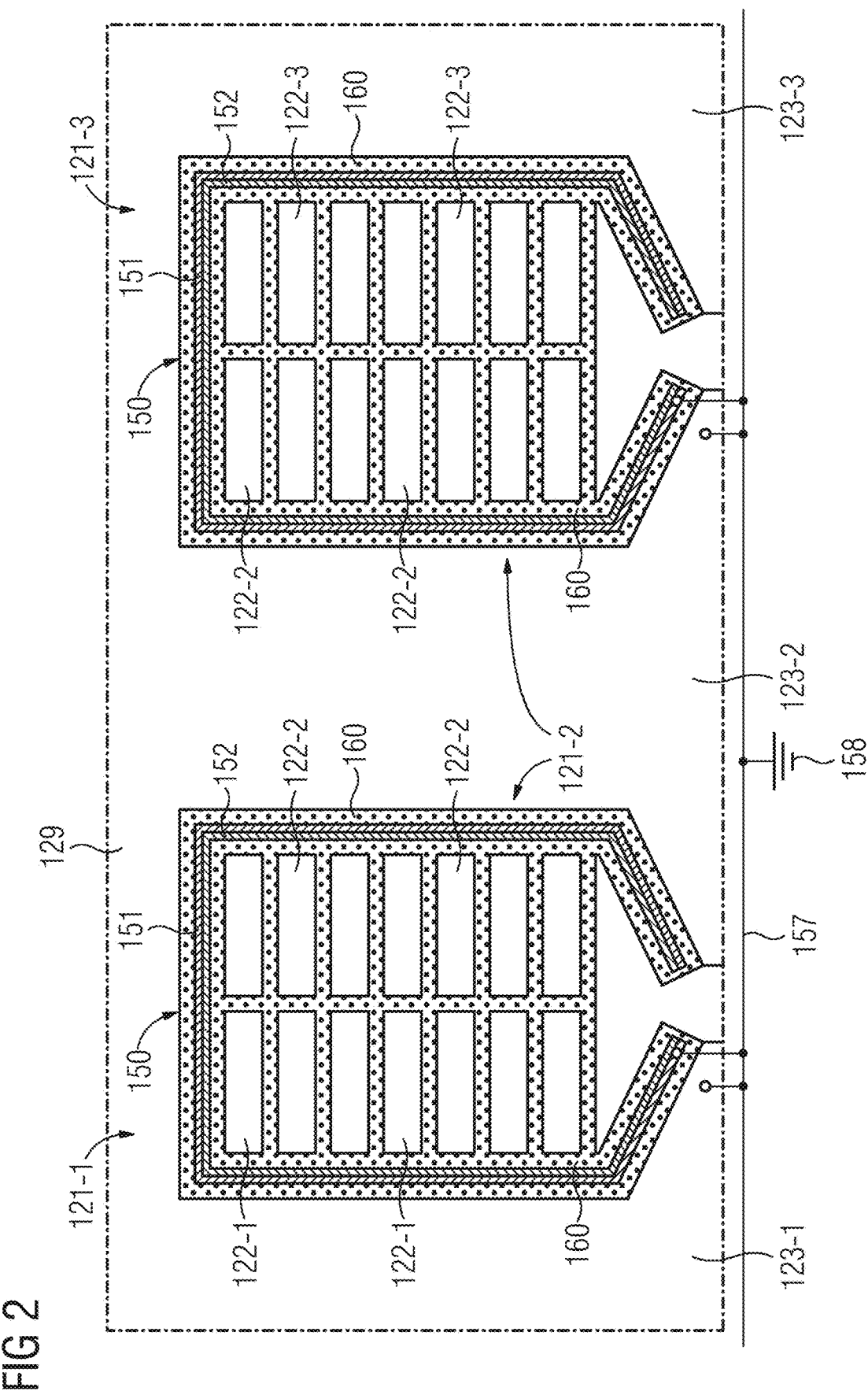
FIG. 2 shows a number of teeth of the stator of the machine with an insulating arrangement in a first embodiment.

FIG. 2 and also the other FIGS. 3-6 respectively show a cutout corresponding to the region denoted in FIG. 1 by "II". Shown there in each case are three adjacent stator teeth 123-1, 123-2, 123-3, with the coils 121-1, 121-2, 121-3 respectively arranged on them. In this case, the teeth 123-1 and 123-3 and the corresponding coils 121-1, 121-2, 121-3 are only half shown. The coils 121-$i$ (with i=1, 2, 3) are formed by coil conductors 122-*i*, which in a known way have been wound on the respective stator tooth 123-*i*. The stator teeth 123-*i* are formed as part of the stator 120 from a metallic laminated core 129, so that in the operating state of the electric machine 100 the problems explained at the beginning as a result of partial discharges etc. may occur.

In order to address this problem, between the respective coil 121-*i* and the stator tooth 123-*i* there is in each case an insulating arrangement 150 for insulating the respective coil 121-*i* from the respective tooth 123-*i*. The entire coil arrangement 200, (including the respective coil 121-*i* and the insulating arrangement 150), is also potted in a way known per se by using an impregnating or potting compound 160, in order to avoid air inclusions.

In the first embodiment, shown in FIG. 2, the insulating arrangement 150 is formed as a slot insulation. The slot insulation 150 is formed in a film-like or sheet-like manner, and therefore extends in principle, (e.g., when it has not yet been placed into the respective slot), in two spatial directions and has a comparatively negligible extent in the third spatial direction. The slot insulation 150 includes a first, electrically conductive layer 151 and a second, electrically insulating layer 152. In this example, the first layer 151, representing a conductive surface, has been applied to the second layer 152. The second layer 152 may include a thermoplastic. In this case, the slot insulation 150 is arranged in the interspace between the tooth 123-*i* and the coil 121-*i* wound onto this tooth 123-*i* in such a way that the first, electrically conductive layer 151 is facing the tooth 123-*i* and the second, electrically insulating layer 152 is facing the coil 121-*i*. Furthermore, the first layer 151 is electrically connected to the laminated core 129 of the stator 120 by way of an electrical connection 157, for example, in that it is contacted with the stator tooth 123-*i* or in that it is placed into the corresponding slot between the coil 121-*i* and the tooth 123-*i* in such a way that the conductive first layer 151 of the slot insulation 150 at least at one point establishes electrical contact with the laminated core 129, so that the same electrical potential forms at these two components 151 and 123-*i* or 129. In FIG. 2 and also in the other FIGS. 3-6, this connection 157 is only schematically indicated and, by way of example, is connected directly to ground 158.

This electrical contacting and the accompanying potential shaping prevent the occurrence of an electrical voltage between the laminated core 129 or the tooth 123-*i* and the surface facing it of the insulating arrangement 150, and consequently the occurrence of partial discharges in this region.

To produce such a stator 120 with a film-like slot insulation 150, the slot insulation 150 is first positioned as described in the slot between respectively adjacent teeth 123-*i*, so that the conductive surface or the first layer 151 is in electrical contact with the laminated core 129. Subsequently, to form the coil 121-*i*, the winding of the tooth 123-*i* with the coil conductor 122-*i* and the final impregnation or potting with the corresponding compound 160 are performed. The slot insulation 150 may be led out beyond the extent of the teeth 123-*i* in the axial direction of the stator 120, in order to provide the necessary air gaps and creep paths in the winding overhang region. In this case, however, the first layer 151 may not protrude in this axial direction beyond the slot or the teeth 123-*i*, but remain restricted to the corresponding extent of the teeth 123-*i*.

Figure 3:
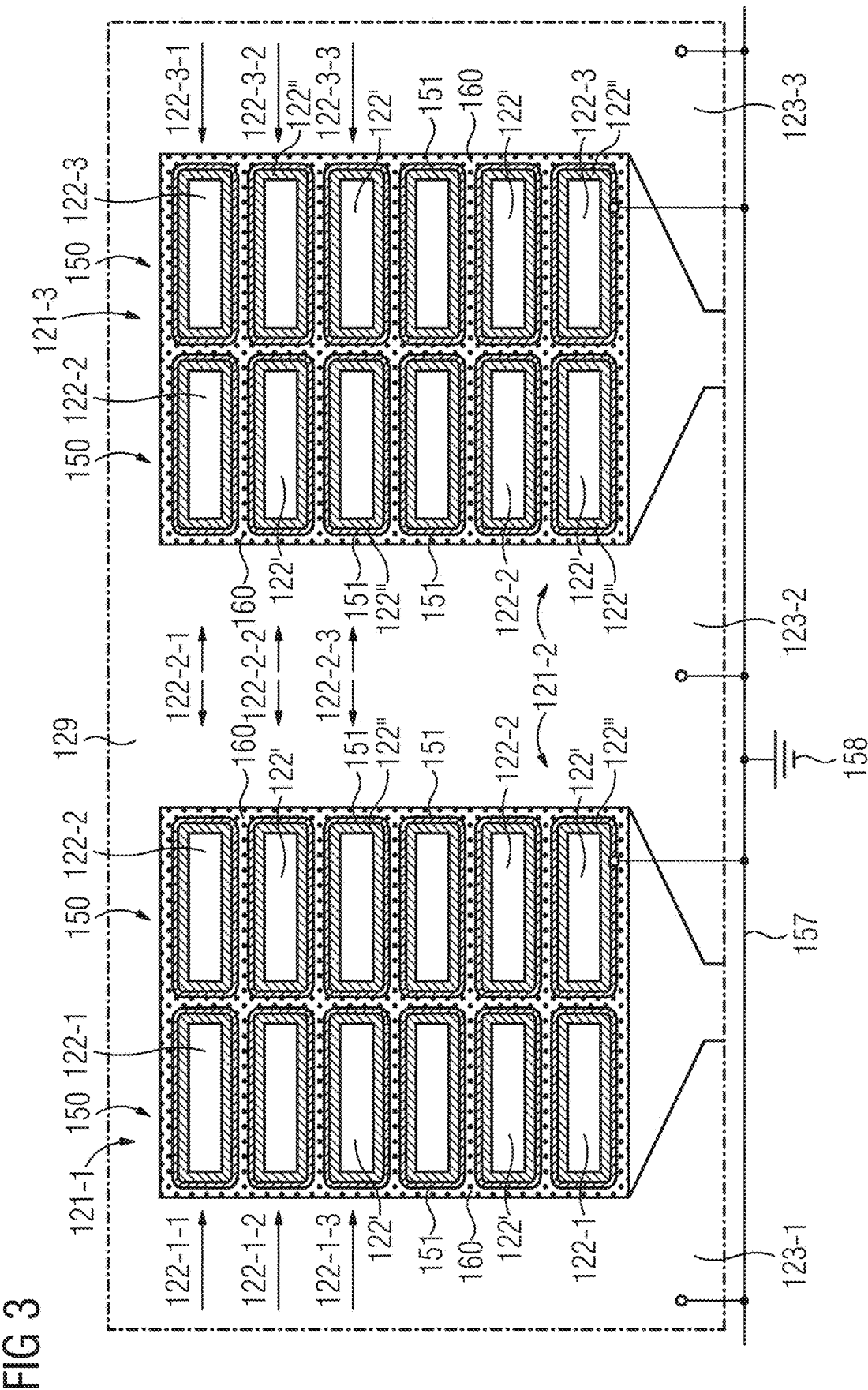
FIG. 3 shows the stator teeth with an insulating arrangement in a second embodiment.

In a second embodiment, which is shown in FIG. 3, the insulating arrangement 150 is no longer formed in a film-like or sheet-like manner, but in a tubular manner. As in the first embodiment, it has an electrically conductive first layer 151, which consequently, as part of the insulating arrangement 150, is likewise formed in a tubular manner. The meaning of the term "tubular" has already been explained at the beginning. The tubular form of the insulating arrangement 150 in effect allows that a closed surface forms around every turn 122-*i*-*k*, with k=1, 2, 3, . . . , of the respective coil conductor 122-*i* into which the coil conductor 122-*i* may be placed.

As a difference from the first embodiment, the coil conductor 122-*i* forming the respective coil 121-*i* has been placed into the first layer 151. The tubular first layer 151 completely surrounds the coil conductor 122-*i* in the circumferential direction thereof, so that it accordingly extends within the tubular first layer 151. The coil conductor 122-*i* for its part includes an electrically conductive wire 122', which may be formed, for example, as a round or flat wire, and also a substantially tubular wire insulation 122", which surrounds the wire 122' in the circumferential direction thereof with respect to the longitudinal extent of the wire 122' and is not electrically conducting. The latter may include a thermoplastic.

Realized by the first layer 151, the wire insulation 122" is provided with a conductive surface. As in the first embodiment, this first layer 151 is electrically connected to the laminated core 129, so that the electrical potential at the surface 151 of the wire insulation 122" by definition corresponds to that of the laminated core 129. Therefore, partial discharges cannot occur either within the slot or in the region of the winding overhangs. Moreover, there is also no potential difference between the surfaces of the coil conductors 122-*i*, 122-*j* or the first layers 151 of the coil conductors 122-*i*, 122-*j* of the coils 121-*i*, 121-*j* of adjacent teeth 123-*i*, 123-*j* (in each case with i≠j), because all of the coil conductors 122-*i* are in each case electrically connected to the laminated core 129 and accordingly have the same potential. Accordingly, partial discharges are also avoided between the various turns 122-*i*-*k* of the same coil 122-*i* and between the turns 122-*i*-*k*, 122-*j*-*l* of adjacent coils 122-*i*, 122-*j*, with k=1, 2, 3, . . . and l=1, 2, 3, . . . .

Figure 4:
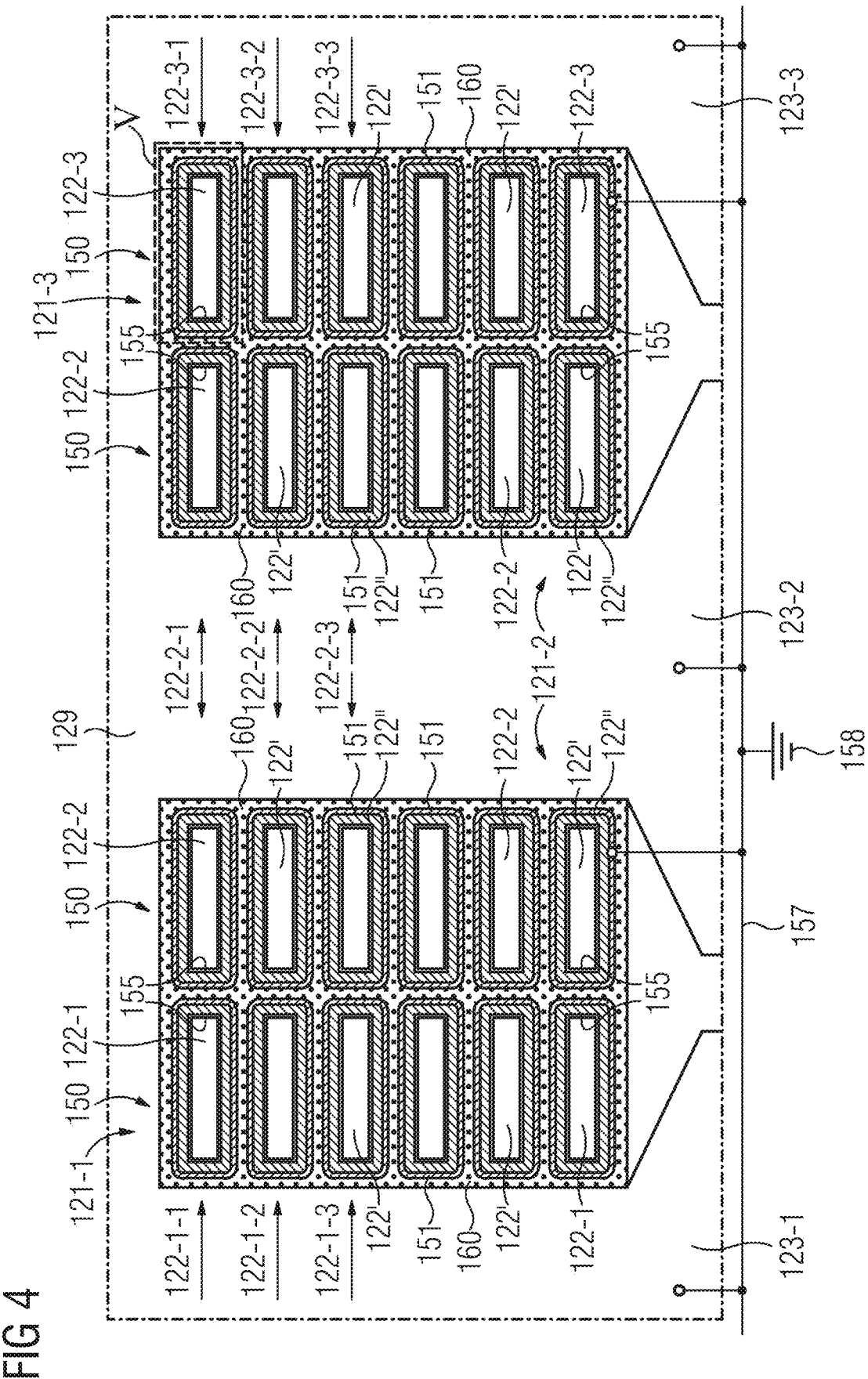
FIG. 4 shows the stator teeth with an insulating arrangement in a third embodiment.

FIG. 4 shows a third embodiment of the insulating arrangement 150. The still tubular insulating arrangement 150 includes, as in the second embodiment, the already introduced electrically conductive first layer 151, which in turn is connected to the laminated core 129 by way of the connection 157 and surrounds the respective coil conductor 122-*i*. The electrical contacting of the first layer 151 with respect to the tooth 123-*i* or the laminated core 129 applies to all the turns of the coil conductor 122-*i*. In addition, the insulating arrangement 150 has a further electrically conductive layer 155, which is likewise formed in a tubular manner and moreover is arranged between the wire 122' and the wire insulation 122", surrounding the wire 122' in the tangential direction with respect to the longitudinal extent of the wire 122', so that the wire 122' extends in its longitudinal direction within the further layer 155. Accordingly, the first layer 151, the further layer 155 and also the wire insulation 122" and the wire 122' itself are to the greatest extent coaxial in relation to one another. The further layer 155 and the wire 122' are in this case electrically connected to one another or in contact, because the further layer 155 lies directly on the surface of the wire.

Figure 5:
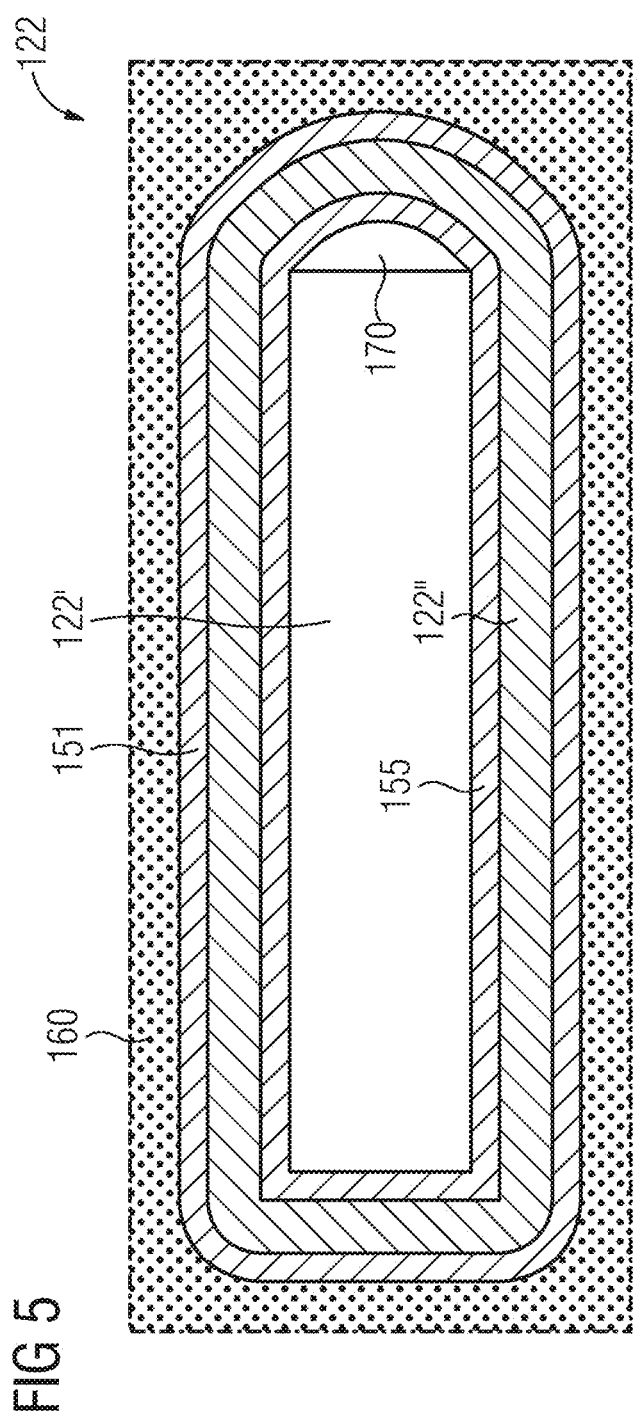
FIG. 5 shows details of the insulating arrangement in the third embodiment.

To illustrate the functional mode, in particular of the third embodiment, FIG. 5 shows the cutout denoted in FIG. 4 by "V" and marked there by a dashed line. If the wire insulation 122" may lift off from the wire 122', for example, due to aging or high mechanical stressing at individual points, a local air inclusion 170 may form at the corresponding point.

Because the further layer 155 is arranged completely surrounding the wire 122', the electrical contact between the wire 122' and the further layer 155 remains ensured, so that the function of the insulating arrangement 150 with regard to the avoidance of partial discharges is also ensured in this case. In other words, the occurrence of partial discharges due to delamination of the wire insulation 122" from the wire 122' may therefore be additionally prevented by the additional conductive surface in the form of the further layer 155 between the wire insulation 122" and the wire 122'.

Figure 6:
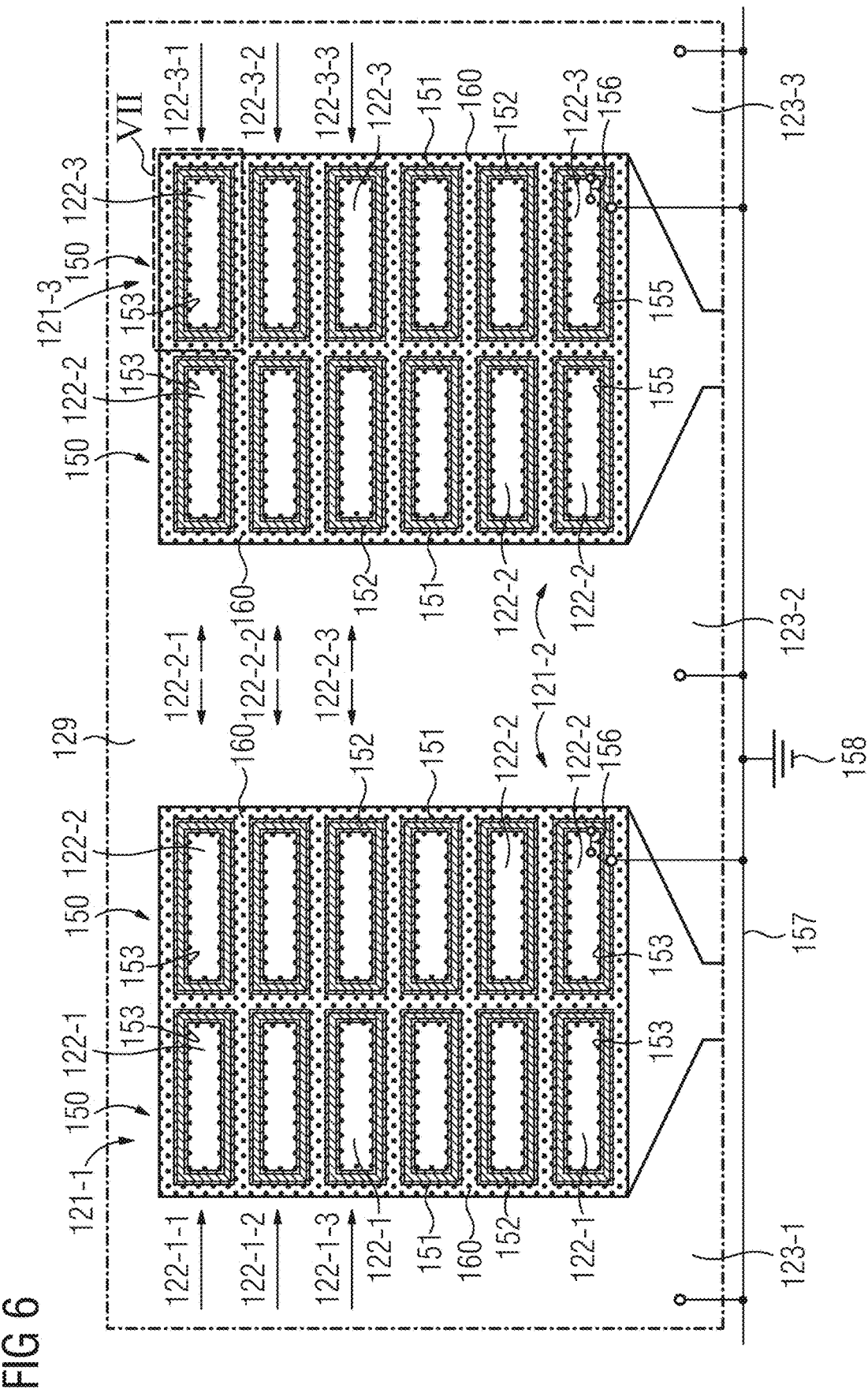
FIG. 6 shows the stator teeth with an insulating arrangement in a fourth embodiment.

FIG. 6 shows a fourth embodiment of the insulating arrangement 150. Moreover, to illustrate the fourth embodiment, FIG. 7 shows the cutout denoted in FIG. 6 by "VII" and marked there by a dashed line. In this case, the insulating arrangement 150 includes the electrically conductive first layer 151, an electrically insulating second layer 152, (e.g., made of a thermoplastic), and an electrically conductive third layer 153. The insulating arrangement 150 and also all of its layers 151, 152, 153 are arranged in a tubular manner, and furthermore coaxially in relation to one another, the insulating second layer 152 lying within the conductive first layer 151 and the conductive third layer 153 lying within the insulating second layer 152. The respective coil conductor 122-i, which in this case does not have any wire insulation of its own, but just the wire 122', is arranged within the third layer 153, so that it extends in its longitudinal direction within the third layer 153. Furthermore, the wire 122' is electrically connected to the third layer 153 surrounding it. As symbolized in FIG. 6 by the connection 156, this takes place at one or more points for each coil winding 122-i, (e.g., in some cases, at a plurality of points for each winding). As a difference from the third embodiment of FIGS. 4 and 5, the conductive third layer 153 is however not necessarily in direct, full-surface contact with the wire 122'. As indicated in FIG. 6, during the production process, potting compound 160 may also get into the region between the third layer 153 and the wire 122'.

In particular with regard to the second to fourth embodiments, shown in FIGS. 3-6, in which the insulating arrangement 150 is in each case of a tubular design and completely surrounds the respective coil conductor 122-i in various ways in the circumferential direction thereof, no electrical fields emanate any longer from the respective coil conductor 122-i between the individual turns 122-i of a respective coil 121-i and also between the coils 121-i or their coil conductors 122-i of different teeth 123-i in the region of the impregnation or the potting 160. Accordingly, the potting or impregnating material 160 no longer has to be of an electrically insulating design. The material 160 is therefore enriched by using electrically conductive particles, whereby the thermal conductivity of the thus modified potting or impregnating material 160 may also be significantly increased, accompanied by a significantly improved removal of heat from the stator 120. The enrichment of the potting or impregnating material 160 with conductive particles is uncritical in terms of safety in particular whenever the insulating arrangement 150 or its first layer 151 as well as the laminated core 129 are grounded.

In the third and also in the fourth embodiment, which are shown in FIGS. 4-6, the insulating arrangement 150 in each case includes an electrically insulating layer 122" or 152, respectively. On both sides of this insulating layer 122" or 152 there is arranged in each case an electrically conductive layer 151, 155 or 151, 153, respectively. By such an electrically conductive coating on both sides of the insulating layer 122" or 152, both the region between the insulation 122" or 152 and the laminated core 129, and that between the insulating arrangement 150 and the coil conductor 122 is kept free from partial discharges.

For the production or the construction of the stator 120 on the basis of one of the second to fourth embodiments, the coil conductor 122 insulated in this way may be pre-formed and inserted into the slot or be wound directly onto the tooth 123. As a result, the electrically conductive first layer 151 located on the respective outer side of the coil conductor 122 is in contact with the laminated core 129, so that the same potential forms at the surface 151 of the insulation and at the laminated core 129.

Because the surface of the insulated coil conductor 122 no longer has any potential difference with respect to the surroundings, compact designs of the stator 120 with short winding overhangs and without additional air gaps and creep paths are possible.

The electrical contacting on the inner side of the insulating arrangement 150 with the wire 122' may take place by dispensing entirely with a wire insulation 122", or separately, if for instance this is not expedient in the case of stranded wires 122'. As a result, a field-free region, and consequently protection from partial discharges, is also achieved within the insulation.

With regard to the production of the insulating arrangement 150 itself, the electrically non-conductive layer 152 or 122" may be produced from a thermoplastic, (e.g., from PEEK). In the corresponding extrusion process, this may be applied directly to the first layer 151. In the case of this process, air inclusions in the thermoplastic may be restricted to a few micrometers. The non-insulating or conductive first layer 151, and possibly also the likewise conductive third layer 153, may be applied on the upper side and/or underside of the electrically insulating second layer 152 by coextrusion in the same process act. For this purpose, the base material of the second layer 152, (e.g., the thermoplastic), on the corresponding surface is interspersed with conductive or else only semi-conductive particles. In the polymer melt, this (e.g., semi-) conductive layer 151 or layer 153 bonds together with the insulating base layer 152 and prevents delaminations, as may occur when different materials are combined.

Any damage to the conductive coating 151 that may occur at isolated points during introduction into the slot may be accepted, as long as the electrical field distribution remains virtually uninfluenced by it during the operation of the electric machine 100. If the thickness of the first layer 151 is chosen to be sufficiently great, it is possible to dispense with the use of a dedicated slot insulation. For this purpose, an asymmetric layer 151 may also be applied in the aforementioned coextrusion process, made larger only in the direction of the laminated core 129 but made as small as possible between the coil conductors 122.

Finally, it should be noted that the representations in the various figures are not necessarily to scale. Some components have been shown enlarged to illustrate certain features. Also, for the sake of clarity, not all of the components have been provided with designations, but only a selection of such components, which is to the greatest extent arbitrary. This concerns, for example, the coil conductors 122 and their wires 122' and also wire insulations 122' and the first, second, third and further layers 151, 152, 153, 155, etc.; the same applies to the turns 122-i-k of the coils 121-i or the coil conductors 122-i, of which only the first three in each case have been provided with designations 122-i-1, 122-i-2, 122-i-3. The corresponding numbering would continue in the same way for the other turns.

Although the disclosure has been illustrated and described in greater detail by the exemplary embodiments, the disclosure is not restricted by these exemplary embodiments. Other variations may be derived herefrom by the person skilled in the art, without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A coil arrangement comprising:
a coil formed by an electrical coil conductor, wherein the coil is configured to be arranged at an electrically conductive component of an electric machine; and
an insulating arrangement configured to electrically insulate each individual turn of the electrical coil conductor of the coil from an electrically conductive element of the electric machine,
wherein the insulating arrangement comprises a first, electrically conductive layer configured to be arranged between each individual turn to be insulated of the coil and the electrically conductive element, the first, electrically conductive layer being electrically connectable to the electrically conductive component,
wherein the insulating arrangement and at least the first, electrically conductive layer are configured in a tubular manner and surround the electrical coil conductor of the respective individual turn, and
wherein the electrical coil conductor extends in a longitudinal direction within the insulating arrangement and within the first, electrically conductive layer.

2. The coil arrangement of claim 1, wherein the electrical coil conductor comprises an electrically conductive wire and a tubular wire insulation,
wherein the tubular wire insulation surrounds the electrically conductive wire and is not electrically conducting,
wherein the electrically conductive wire extends in the longitudinal direction within the tubular wire insulation, and
wherein the first, electrically conductive layer of the insulating arrangement is positioned between the electrically conductive wire and the tubular wire insulation, surrounding the electrically conductive wire, so that the electrically conductive wire extends in the longitudinal direction within the first, electrically conductive layer and is electrically connected to the first, electrically conductive layer.

3. The coil arrangement of claim 1, wherein the electrical coil conductor comprises an electrically conductive wire and a tubular wire insulation,
wherein the tubular wire insulation surrounds the electrically conductive wire and is not electrically conducting,
wherein the electrically conductive wire extends in the longitudinal direction within the tubular wire insulation, and
wherein the first, electrically conductive layer of the insulating arrangement surrounds the tubular wire insulation.

4. The coil arrangement of claim 3, further comprising:
a further electrically conductive layer having a tubular configuration and being arranged between the electrically conductive wire and the tubular wire insulation, surrounding the electrically conductive wire, so that the electrically conductive wire extends in the longitudinal direction within the further electrically conductive layer and is electrically connected to the further electrically conductive layer.

5. The coil arrangement of claim 1, further comprising:
a second, electrically insulating layer; and
a third, electrically conductive layer,
wherein the first, electrically conductive layer, the second, electrically insulating layer and the third, electrically conductive layer each have a tubular configuration and are arranged coaxially in relation to one another,
wherein the second, electrically insulating layer is arranged within the first, electrically conductive layer,
wherein the third, electrically conductive layer is arranged within the second, electrically insulating layer, and
wherein the electrical coil conductor is arranged within the third, electrically conductive layer, so that the electrical coil conductor extends in the longitudinal direction within the third, electrically conductive layer and is electrically connected to the third, electrically conductive layer.

6. The coil arrangement of claim 5, wherein the second, electrically insulating layer comprises a thermoplastic.

7. The coil arrangement of claim 1, wherein the electrically conductive element from which at least one turn of the electrical coil conductor of the coil is configured to be insulated is a further turn of the electrical coil conductor or a further turn of a separate electrical coil conductor of a further coil of the electric machine.

8. The coil arrangement of claim 1, wherein the coil arrangement is potted with a potting compound having electrically conductive particles.

9. The coil arrangement of claim 1, wherein the first, electrically conductive layer and the electrically conductive component are grounded.

10. The coil arrangement of claim 1, wherein the insulating arrangement comprises an insulating layer,
wherein the insulating layer comprises a thermoplastic.

11. A coil arrangement comprising:
a coil formed by an electrical coil conductor, wherein the coil is configured to be arranged at an electrically conductive component of an electric machine; and
an insulating arrangement configured to electrically insulate at least one turn of the electrical coil conductor of the coil from an electrically conductive element of the electric machine,
wherein the insulating arrangement comprises a first, electrically conductive layer configured to be arranged between the turn to be insulated of the coil and the electrically conductive element, the first, electrically conductive layer being electrically connectable to the electrically conductive component,
wherein the electrically conductive element is a laminated core of a stator or of a rotor of the electric machine on which the coil is configured to be arranged,
wherein the insulating arrangement is a slot insulation, wherein the slot insulation is positioned between the coil and the electrically conductive element, wherein the slot insulation comprises the first, electrically conductive layer and a second, electrically insulating layer, wherein the first, electrically conductive layer is a conductive surface that is applied to the second, electrically insulating layer, wherein, as viewed in an axial direction of the electric machine, the second, electrically insulating layer is dimensioned in such a way that the second, electrically insulating layer protrudes beyond axial ends of the electrically conductive element, and wherein the first, electrically conductive layer is dimensioned in such a way that the first, electrically conductive layer does not protrude beyond the axial ends of the electrically conductive element.

12. The coil arrangement of claim 11, wherein the second, electrically insulating layer comprises a thermoplastic.

13. The coil arrangement of claim 11, wherein the laminated core is a tooth of the stator or the rotor.

14. The coil arrangement of claim 11, wherein the slot insulation is positioned between the coil and the electrically conductive element in such a way that the first, electrically conductive layer is facing the electrically conductive element and the second, electrically insulating layer is facing the coil.

15. A method for electrically insulating at least one turn of an electrical coil conductor of a coil of an electric machine, the method comprising:

applying a first, electrically conductive layer of an insulating arrangement onto a second, electrically insulating layer of the insulating arrangement to provide a sheet-like slot insulation;

placing the sheet-like slot insulation in a spatial region between a first tooth and a tooth adjacent to the first tooth of the electric machine such that the first, electrically conductive layer enters into electrical contact with an electrically conductive component of the electric machine; and winding the electrical coil conductor of the respective coil onto each tooth of the electric machine that is in electrical contact with the sheet-like slot insulation, so that the sheet-like slot insulation is positioned between the first tooth and the electrical coil conductor wound onto this first tooth, wherein, as viewed in an axial direction of the electric machine, the second, electrically insulating layer is dimensioned in such a way that the second, electrically insulating layer protrudes beyond axial ends of the electrically conductive component, and wherein the first, electrically conductive layer is dimensioned in such a way that the first, electrically conductive layer does not protrude beyond the axial ends of the electrically conductive component.

16. A method for electrically insulating at least one turn of an electrical coil conductor of a coil of an electric machine, the method comprising:

applying a first, electrically conductive layer of an insulating arrangement onto a second, electrically insulating layer of the insulating arrangement;

placing the electrical coil conductor into the insulating arrangement and shaping the insulating arrangement into a tubular form in such a way that the insulating arrangement provides a closed surface that surrounds each individual turn of the electrical coil conductor, so that each respective turn of the electrical coil conductor extends in a longitudinal direction within the insulating arrangement, wherein the second, electrically insulating layer is arranged within the first, electrically conductive layer and each respective turn of the electrical coil conductor is arranged within the second, electrically insulating layer; and winding the electrical coil conductor to form the coil, wherein the first, electrically conductive layer is brought into electrical contact with an electrically conductive component of the electric machine.

* * * * *